(12) United States Patent
Grechanik et al.

(10) Patent No.: US 9,323,505 B2
(45) Date of Patent: *Apr. 26, 2016

(54) SYSTEMS AND METHODS FOR HANDLING DATABASE DEADLOCKS INDUCED BY DATABASE-CENTRIC APPLICATIONS

(71) Applicant: ACCENTURE GLOBAL SERVICES LIMITED, Dublin (IE)

(72) Inventors: Mark Grechanik, Chicago, IL (US); Qing Xie, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,548

(22) Filed: Jun. 23, 2014

(65) Prior Publication Data

US 2014/0304680 A1 Oct. 9, 2014

Related U.S. Application Data

(63) Continuation of application No. 12/856,356, filed on Aug. 13, 2010, now Pat. No. 8,769,496.

(51) Int. Cl.
*G06F 9/44* (2006.01)
*G06F 17/30* (2006.01)

(52) U.S. Cl.
CPC ............ *G06F 8/35* (2013.01); *G06F 17/30436* (2013.01)

(58) Field of Classification Search
None
See application file for complete search history.

(56) References Cited

U.S. PATENT DOCUMENTS

| | | | | |
|---|---|---|---|---|
| 5,257,363 A * | 10/1993 | Shapiro et al. | ................... | 703/13 |
| 5,283,896 A * | 2/1994 | Temmyo | ................... | G06F 9/52 710/200 |
| 5,636,376 A * | 6/1997 | Chang | ........................... | 717/127 |
| 6,286,001 B1 * | 9/2001 | Walker et al. | .................. | 707/697 |
| 6,308,224 B1 * | 10/2001 | Leymann et al. | ............. | 719/310 |
| 6,807,540 B2 * | 10/2004 | Huras | ...................... | G06F 9/526 707/704 |
| 6,957,418 B2 * | 10/2005 | Batcha et al. | .................. | 717/124 |
| 7,275,039 B2 * | 9/2007 | Setteducati | ................... | 705/7.24 |
| 7,302,677 B2 * | 11/2007 | Reissman et al. | ............. | 717/135 |
| 7,519,965 B2 * | 4/2009 | Yoshida | .................. | G06F 9/524 706/45 |
| 7,840,937 B1 * | 11/2010 | Chiluvuri | .................. | G06F 8/30 717/106 |
| 7,840,949 B2 | 11/2010 | Schumacher et al. | | |
| 7,844,953 B2 * | 11/2010 | Morizawa et al. | ............ | 717/126 |
| 8,219,364 B2 * | 7/2012 | Gupta | ....................... | G06F 8/10 703/13 |
| 8,402,318 B2 | 3/2013 | Nieh et al. | | |
| 8,429,631 B2 | 4/2013 | Schumacher et al. | | |
| 8,826,228 B2 * | 9/2014 | Beardslee et al. | ............ | 717/106 |

(Continued)

OTHER PUBLICATIONS

W.M.P. vab der Aalst et al., Modelling and analysisng workflow suing a Petri-net based approach, publisher unkown, published 1994, pp. 1-20.*

(Continued)

*Primary Examiner* — Tuan Q. Dam
*Assistant Examiner* — Zheng Wei
(74) *Attorney, Agent, or Firm* — Harrity & Harrity, LLP

(57) ABSTRACT

Systems and methods are provided for handling database deadlocks induced by database-centric applications (DCAs). SQL statements and transactions associated with the DCAs are analyzed and parsed to generate Petri net models. A supervisory modeler generates augmented Petri net models based on the Petri net models, which are used in generating supervisory control. The supervisory control is used in handling database deadlocks.

20 Claims, 6 Drawing Sheets

(56) References Cited

U.S. PATENT DOCUMENTS

| | | | | |
|---|---|---|---|---|
| 2002/0042850 | A1* | 4/2002 | Huras | G06F 9/526 |
| | | | | 719/330 |
| 2004/0078258 | A1* | 4/2004 | Schulz et al. | 705/9 |
| 2004/0083448 | A1* | 4/2004 | Schulz et al. | 717/101 |
| 2004/0230874 | A1 | 11/2004 | Prang et al. | |
| 2005/0086031 | A1* | 4/2005 | Yoshida | G06F 9/524 |
| | | | | 703/1 |
| 2006/0101081 | A1 | 5/2006 | Lin et al. | |
| 2006/0168555 | A1* | 7/2006 | Represas Ferrao | G06F 8/10 |
| | | | | 717/104 |
| 2006/0242002 | A1 | 10/2006 | Sun et al. | |
| 2007/0233969 | A1 | 10/2007 | Shukla et al. | |
| 2008/0086482 | A1 | 4/2008 | Weissman | |
| 2008/0209422 | A1 | 8/2008 | Coha | |
| 2008/0244537 | A1* | 10/2008 | Wintergerst et al. | 717/130 |
| 2008/0244547 | A1* | 10/2008 | Wintergerst et al. | 717/158 |
| 2008/0320437 | A1* | 12/2008 | Maennel | 717/105 |
| 2009/0106326 | A1 | 4/2009 | Antani et al. | |
| 2009/0172013 | A1* | 7/2009 | Gupta | G06F 17/10 |
| 2009/0235226 | A1* | 9/2009 | Murthy | G06F 8/10 |
| | | | | 717/104 |
| 2010/0114849 | A1* | 5/2010 | Kingsbury et al. | 707/704 |
| 2010/0198799 | A1 | 8/2010 | Krishnan et al. | |
| 2010/0262972 | A1* | 10/2010 | Cocks et al. | 718/104 |
| 2011/0035730 | A1* | 2/2011 | Briggs | 717/128 |
| 2012/0041794 | A1 | 2/2012 | Lemcke et al. | |

OTHER PUBLICATIONS

Adam et al., Modeling and Analysis of Workflows Using Petr Nets, published by Journal of Intelligent Information system 10, pp. 131-158, 1998.*

The Authoritative Dictionary of IEEE Standards Terms, 7$^{th}$ edition, published by IEEE, 2000, p. 268, ISBN 0738126012.*

Agarwal et al., "Detecting Potential Deadlocks with Static Analysis and Run-Time Monitoring," Proc. of Parallel and Distrib. Sys.: Testing and Debugging (PADTAD) Track of the 2005 Haifa Verification Conference, 3875:191-207 (2006).

ANSI/ISO/IEC. Information technology—database languages—sql—part 5: Host language bindings (sql/bindings).Technical report, 1-261 (1999).

Buy et al., "Automatic Real-Time Analysis of Reactive Systems with the PARTS Toolset," Autom. Soft. Eng., 8 (3/4): 227-274 (2001).

Christensen et al., "Precise Analysis of String Expressions," SAS, 1-17 (2003).

Coffman et al., "System Deadlocks," ACM Comput. Surv., 3(2): 67-78 (1971).

Curtis et al., "A Field Study of the Software Design Process for Large Systems," Commun. ACM, 31(11): 1268-1287 (1988).

Ehrig et al., "A Transformation-Based Component Framework for a Generic Integrated Modeling Technique," J. Integrated Des. Proc. Sci., 6(4):78-104 (2002).

Emmi et al., "Dynamic Test Input Generation for Database Applications," ISSTA, 151-162 (2007).

Flyvbjerg, "Five Misunderstandings about Case-Study Research," Qualit. Inq. 12(2):219-245 (2006).

Fu et al., "A Static Analysis Framework for Detecting SQL Injection Vulnerabilities," COMPSAC, (1):87-96 (2007).

Giua et al., "Generalized Mutual Exclusion Constraints on Nets with Uncontrollable Transitions," Proc. IEEE Int. Conf. on Systems, Man, and Cybernetics, 974-979 (1992).

Godefroid et al., "Grammar-based Whitebox Fuzzing," PLDI, 206-215 (2008).

Grechanik et al., "Maintaining and Evolving GUI-Directed Test Scripts," ICSE, 408-418 (2009).

Grechanik et al., "Recovering and Using Use-Case-Diagram-To-Source-Code Traceability Links," ESEC/SIGSOFT FSE, 95-104 (2007).

Halfond et al. "Combining Static Analysis and Runtime Monitoring to Counter SQL-Injection Attacks," Proc. 3rd Int. ICSE Workshop Dyn. Analy. 22-28 (2005).

He et al., "Decomposition in Automatic Generation of Petri Nets for Manufacturing System Control and Scheduling," Int. J. Prod. Res., 38(6):1437-1457 (2000).

Iordache et al., "Supervision Based on Place Invariants: A Survey," Discrete Event Dyn. Sys., 16(4):451-492 (2006).

Iordache et al.,"Synthesis of Deadlock Prevention Supervisors Using Petri Nets," IEEE Trans. Robot. Automat., 18(1):59-68 (2002).

Kapfhammer et al., "A Family of Test Adequacy Criteria for Database-Driven Applications," Proc. 11th ACM SIGSOFT Int. Symp. Found. Software Eng, (FSE), 98-107 (2003).

Landi, "Undecidability of Static Analysis," ACM Lett. Program. Lang. Sys., 1(4):323-337 (1992).

Li et al., "A Survey and Comparison of Petri Net-Based Deadlock Prevention Policies for Flexible Manufacturing Systems," IEEE Trans. on Systems, Man, and Cybernetics, Part C: Application and Reviews, 38(2):173-188 (2008).

Li et al., "Control of Elementary and Dependent Siphons in Petri Nets and their Application," IEEE Trans. on Systems, Man and Cybernetics: Part A, 38(1):133-148, (2008).

Logean et al., "Run-Time Monitoring of Distributed Applications," Middleware '98: Proc. of IFIP Int. Conf. Distr. Sys. Platforms and Open Distr. Proc., 459-474 (1998).

Moody et al., "Petri Net Supervisors for DES in the Presence of Uncontrollable and Unobservable Transitions," IEEE Trans. Automat. Control, 45(3):462-467 (2000).

Murata, "Petri Nets: Properties, Analysis and Applications," Proc. IEEE, 77(4):541-580 (1989).

Rana et al., "Performance Analysis of Java Using Petri Nets," HPCN Europe 2000: Proc. 8th Int. Conf. High-Performance Comp. Networking, 657-667(2000).

Sampath et al., "Control reconfiguration of discrete event systems with dynamic control specifications," IEEE Trans. Autom. Sci. and Eng., 5(1):84-100 (2008).

Shantz et al., "An Application of Petri Net Reduction for ADA Tasking Deadlock Analysis," IEEE Trans. on Parallel and Distr. Sys., 7(12):1307-1322 (1996).

Sloan et al., "Reduction Rules for Time Petri Nets," Acta Informatica, 33(7):687-706 (1996).

Wang et al., "The Application of Supervisory Control to Deadlock Avoidance in Concurrent Software," 9th Int. Workshop on Discrete Event Sys. (WODES 2008), 468-473(2008).

Wang et al., "The Theory of Deadlock Avoidance via Discrete Control," POPL, 252-263 (2009).

Wassermann et al., "Static Checking of Dynamically Generated Queries in Database Applications," ICSE, 645-654 (2004).

Wassermann et al., "Sound and Precise Analysis of Web Applications for Injection Vulnerabilities," PLDI, 32-41 (2007).

Williams et al., "Static Deadlock Detection for Java Libraries," ECOOP 2005—Object-Oriented Programming, 19th European Conf., 602-629 (2005).

Xie et al., "Counterexamples to 'Liveness-Enforcing Supervision of Bounded Ordinary Petri Nets Using Partial Order Methods,'" IEEE Transactions on Automatic Control 49(7): 1217-1220 (2004).

Yamalidou et al., "Feedback Control of Petri Nets Based on Place Invariants," Automatica, 32(1):15-28 (1996).

Kieżun et al., "HAMPI: A Solver for String Constraints," ISSTA 2009, Proceedings of the 2009 International Symposium on Software Testing Analytics, Jul. 19-23, 2009, 11 pages.

Nonemacher, "Java Developer's Journal Feature: Deadlocks in J2EE," Java Development, J., http://java.sys-con.com/node/204688, Apr. 11, 2006, 7 pages.

Reisig, "Petri Nets: An Introduction," Springer-Verlag, Berlin-New York, 1985, 161 pages.

Ullman et al., "Database Systems: The Complete Book," Prentice Hall PTR, Upper Saddle River, NJ, USA, 2001, 1240 pages.

Yin, "Applications of Case Study Research Second Edition," (Applied Social Research Methods Series vol. 34), Sage Publications, Inc., 2002, 231 pages.

* cited by examiner

SYSTEMS AND METHODS FOR HANDLING DATABASE DEADLOCKS INDUCED BY DATABASE-CENTRIC APPLICATIONS

RELATED APPLICATIONS

This application is a continuation of U.S. patent application Ser. No. 12/856,356, filed Aug. 13, 2010 (now U.S. Pat. No. 8,769,356), the disclosure of which is incorporated herein by reference in its entirety.

TECHNICAL FIELD

This disclosure is directed to systems and methods for handling database deadlocks, and more particularly, to systems and methods for handling database deadlocks induced by database-centric applications.

BACKGROUND

Large organizations today face many challenges when engineering large custom software applications. For example, these custom software applications may be required to meet the needs of various departments within the organizations. These custom software applications may be required to interface with other software applications used by users located at different geographic locations. These organizations commonly use database-centric applications (DCAs) which in turn use nontrivial databases. DCAs are applications that interact directly with databases, and data related to the DCAs are stored in the databases. The DCAs typically contain multiple concurrent threads and processes that access and manipulate one or more shared databases concurrently. DCAs typically use shared databases without notifying other applications that also use the shared databases. In addition, different applications are often developed by different departments within the organizations or by different organizations without coordinating with one another. Sharing databases thus leads to a high incidence of concurrency errors known as database deadlocks, which is one of the main reasons for major performance degradation in the DCAs.

Concurrency errors, or database deadlocks occur when two or more threads of execution lock one resource while waiting for other resources. When this occurs in a circular fashion, the database is "deadlocked." Database deadlocks are special kinds of deadlocks that result from interactions between DCAs and shared databases. To date, database deadlocks are typically detected using various algorithms and resolved using time-out mechanisms provided by a Database Management System (DBMS). Once a deadlock occurs, the DBMS rolls back or reverses the transactions that caused it. For example, the DBMS may unlock resources or cancel waiting requests from other threads of execution when one resource is being used.

One way of avoiding the deadlock involves the use of Structured Query Language (SQL), which is a computer language designed for managing data in a DBMS. The process of avoiding deadlock may include compiling SQL statements, creating and optimizing an execution plan designed to resolve the deadlock, and simulating its execution to determine how basic relational operators in the DBMS would access and manipulate data elements. In practice, this strategy means reproducing the work that the DBMS performs as part of executing transactions, which results in significant overhead that may double the execution time of each SQL statement. In addition, the timeout mechanism and the ensuing transaction rollback causes significant performance degradation in the DCAs involved. Performance degradation in DCAs may in turn result in significant financial costs to organizations running DCAs and their clients. Further, the possibility of concurrency errors has forced software developers to adopt a "defensive" programming style, which stifles productivity.

In another aspect, database deadlocks are fundamentally different because they depend on the structure and the content of a database that is shared by threads or processes of the multiple DCAs that use the database. DBMSes provide layers of abstractions to guarantee Atomicity, Consistency, Isolation, and Durability (ACID) properties. The atomicity property ensures that each transaction in a database is atomic such that if any part of a transaction fails, the entire transaction fails, thus leaving the database unaffected. The consistency property ensures that the database remains in a consistent state, such that if a transaction is executed that violates the database's consistency rules, the transaction could be rolled back or reversed to the pre-transaction state. The isolation property ensures that other transactions do not access data that has been modified during a transaction that has not yet completed. The durability property ensures that the DBMS can recover any transaction updates in the event of a system failure. These properties help to make database transactions process reliably. But, these properties do not prevent deadlocks, which are viewed as the responsibility of database users and/or programmers. However, it is difficult to determine in advance what SQL statements these users will execute. It is similarly difficult to determine in advance all users of the systems and what DCAs the users may run that will share the same database.

Moreover, since database deadlocks are not explicit, i.e., there is no clear indication as to which DCAs may potentially create the deadlock, they cannot be easily identified by analyzing source code of the DCAs that may be involved in the deadlocks. This problem is aggravated by the fact that nontrivial DCAs are highly concurrent and use multiple levels of abstraction. Database deadlocks appear often after applications grow in complexity in different ways: more DCAs are added; more data is added to the database; transactions become longer; new transactions are added; the order of lock requests is modified; the type of the database is changed, etc. It is a time consuming task to detect database deadlocks in DCAs by analyzing their source code. Currently, it is the job of the database engine to detect deadlocks and resolve them by discarding some transactions. By the time these deadlocks are resolved, damage to system performance is done. In addition, certain discarded transactions may result in errors and exceptions inside the DCAs that issued the cancelled transactions resulting in the loss of valuable and intensive computations that have already been performed by the transactions prior to their cancellation.

Identifying database deadlocks thus requires sophisticated reasoning regarding the behavior of DCAs and the databases that they use. This process is overwhelmingly complex and may impose a significant cost to achieve desired performance of software. It is thus desirable to provide systems and methods to handle the database deadlocks.

SUMMARY

In one embodiment, a method is provided for detecting database deadlocks induced by database-centric applications. The method may include retrieving data associated with a plurality of database-centric applications (DCAs) from a database. The method may also include identifying at least one structured query language (SQL) statement and at least one transaction from the data associated with the plurality of DCAs. The method may further include parsing the at least one SQL statement and the at last one transaction into syntax trees. The syntax trees may identify a data structure of the at least one SQL statement and the at least one transaction. The method may also include generating at least one Petri net model based on the syntax trees and a database schema. The at least one Petri net model may identify a flow of operations within the at least one SQL statement and the at least one transaction. The method may also include generating at least one augmented Petri net model based on the at least one Petri net model. The at least one augmented Petri net model identifying a deadlock caused by at least two of the plurality of DCAs.

In another embodiment, a method is provided for handling database deadlocks induced by database-centric applications. The method may include retrieving data associated with a plurality of database-centric applications (DCAs) from a database. The method may also include identifying at least one structured query language (SQL) statement and at least one transaction from the data associated with the plurality of DCAs. The method may further include parsing the at least one SQL statement and the at last one transaction into syntax trees. The syntax trees may identify a data structure of the at least one SQL statement and the at least one transaction. The method may also include generating at least one Petri net model based on the syntax trees and a database schema. The at least one Petri net model may identify a flow of operations within the at least one SQL statement and the at least one transaction. The method may also include generating at least one augmented Petri net model based on the at least one Petri net model. The at least one augmented Petri net model identifying a deadlock caused by at least two of the plurality of DCAs. The method may further include generating at least one supervisory control based on the at least one augmented Petri net model. The at least one supervisory control may facilitate removal of the deadlock In yet another embodiment, a system for detecting database deadlocks induced by database-centric applications is provided. The system may include a retriever for retrieving data associated with a plurality of database-centric applications (DCAs) from a database. The system may also include a processor, communicatively connected to the retriever. The processor may be configured to identify at least one structured query language (SQL) statement and at least one transaction from the data associated with the plurality of DCAs. The processor may also be configured to parse the at least one SQL statement and the at last one transaction into syntax trees. The syntax trees may identify a data structure of the at least one SQL statement and the at least one transaction. The processor may further be configured to generate at least one Petri net model based on the syntax trees and a database schema. The at least one Petri net model may identify a flow of operations within the at least one SQL statement and the at least one transaction. Moreover, the processor may be configured to generate at least one augmented Petri net model based on the at least one Petri net model. The at least one augmented Petri net model identifying a deadlock caused by at least two of the plurality of DCAs.

It is to be understood that both the foregoing description and the following description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

DETAILED DESCRIPTION

Reference will now be made in detail to the present exemplary embodiments consistent with the disclosure, examples of which are illustrated in the accompanying drawings. Wherever convenient, the same reference numbers will be used throughout the drawings to refer to the same or like parts.

Figure 1:
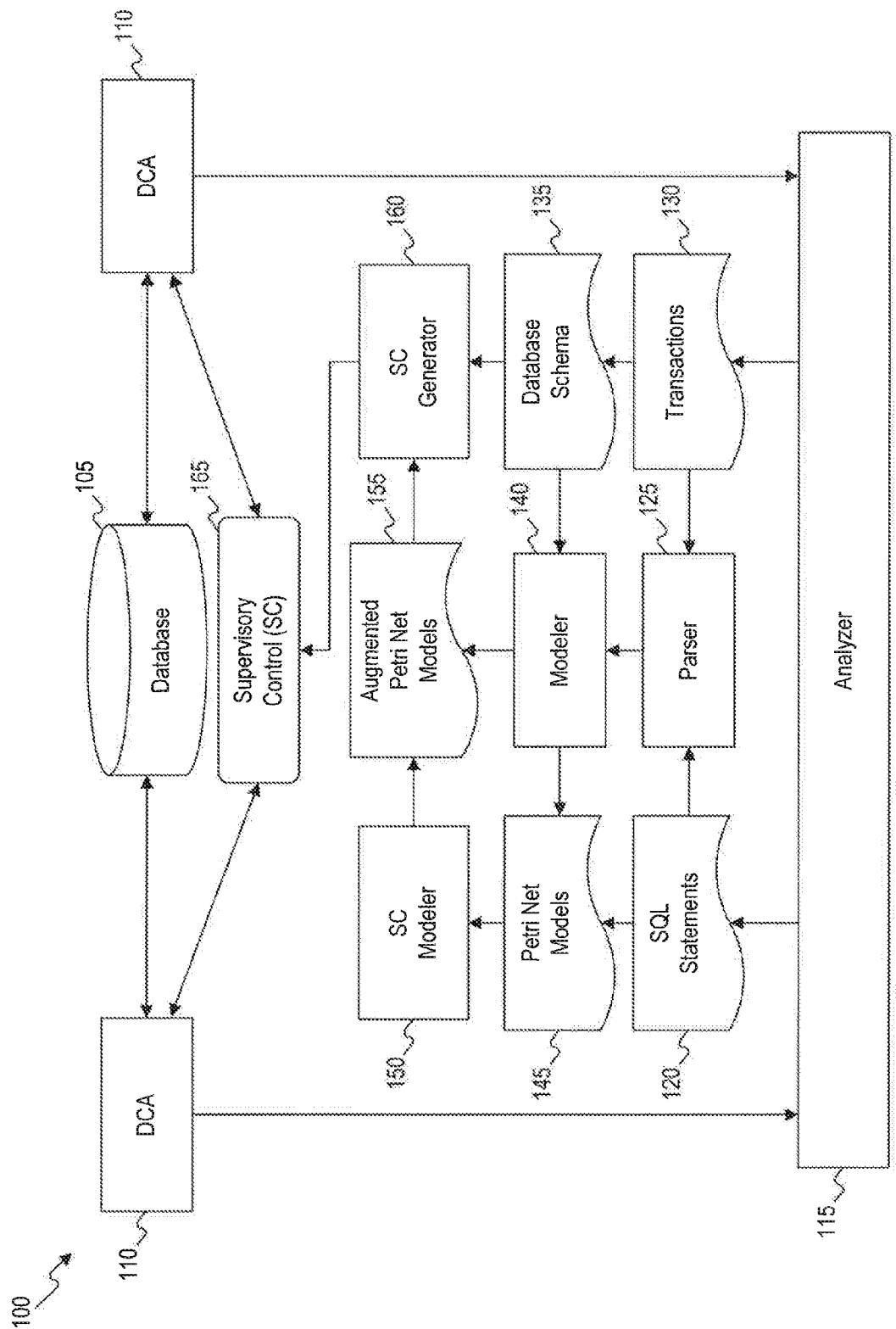
FIG. 1 is a block diagram illustrating an exemplary embodiment of a system for handling database deadlocks induced by database-centric applications.

FIG. 1 illustrates an exemplary system 100 that may be utilized in handling database deadlocks induced by database-centric applications. Organizations that rely upon multiple databases and multiple database-centric applications (DCAs) may implement system 100 in order to manage data consistency and reliability in a more efficient manner. System 100 may assist the organizations in detecting and resolving deadlocks that can potentially occur between the various DCAs.

System 100 may include a database 105, DCAs 110, an analyzer 115, SQL statements 120, a parser 125, transactions 130, a database schema 135, a modeler 140, Petri net models 145, a supervisory control modeler 150, augmented Petri net models 155, a supervisory control generator 160, and a supervisory control 165. Database 105 may comprise one or more databases that store data and are accessed and/or managed through system 100. DCAs 110 may comprise one or more DCAs that access database 105. Analyzer 115 may analyze and extract data from database 105, such as, for example, SQL statements 120, transactions 130, and other information that are stored in database 105. SQL statements 120 and/or transactions 130 may be written by users of system 100 to detect and/or resolve potential database deadlock that may occur between one or more DCAs 110. Parser 125 may operate on SQL statements 120 and/or transactions 130 in order to check for correct syntax and build a data structure, such as, for example, a syntax tree, that is associated with each of SQL statements 120 and/or transactions 130.

Database schema 135 may define the tables, fields, relationships, procedures, functions, and other rules and definitions associated with database 105. Modeler 140, supervisory control modeler 150, and supervisory control generator 160 may each be responsible for generating Petri net models 145, augmented Petri net models 155, and supervisory control 165, respectively. Petri net models 145, augmented Petri net models 155, and supervisory control 165 may be data models that assist in the detection and resolution of potential deadlocks, and they are described in further details with reference to FIGS. 3, 4, and 5 below. In some embodiments, Petri net models 145 and augmented Petri net models 155 may be used in identifying for users of system 100 the potential deadlocks, while supervisory control 165 may be used in demonstrating how the potential deadlocks may be resolved. It is contemplated that DCAs 110 may include one or more DCAs that are written in different programming languages and/or implemented on different platforms. It is also contemplated that system 100 may include more or fewer components as necessary and/or appropriate. It is further contemplated that database 105 may comprise one or more databases that store information and are accessed and/or managed through system 100.

In the embodiment as shown in FIG. 1, interactions between the various components of system 100 are shown with arrows. These arrows may also indicate a direction of transmission of data between the various components of system 100. For example, in the embodiment as shown, data may be transmitted between database 105 and DCAs 110. In some embodiments, a retrieving component (i.e., a retriever) related to DCAs 110 may be used to retrieve the data from database 105. It is contemplated that any appropriate retrieving component may be used. For example, the retrieving component may be a module, an application, or a program that may be written in various computer languages such as Perl, Hypertext Preprocessor (PHP), SQL, etc. In some embodiments, data may be transmitted from database 105 to DCAs 110, and vice versa. Similarly, data may be transmitted between DCAs 110 and supervisory control 165.

In an embodiment as shown, data may be transmitted from DCAs 110 to analyzer 115. In other words, analyzer 115 may receive data from DCAs 110. In some embodiments, analyzer 115 may extract SQL statements 120 and transactions 130 from the data received from DCAs 110. In some embodiments, the data may have been transmitted to DCAs 110 from database 105. There are various ways to obtain SQL statements 120. For example, users of system 100 may create SQL statements 120 and test SQL statements 120 against database 105 before SQL statements 120 are placed in and/or used by DCAs 110. In some embodiments, SQL statements 120 may be approved and documented by system administrators prior to storing SQL statements 120 in database 105. In some embodiments, the documentations created by system administrators may be analyzed along with SQL statements 120 and their source code.

For another example, SQL statements 120 may be recovered from the source code of DCAs 110 using static analyses. There are many known techniques, algorithms, and applications for recovery of string expressions, particularly SQL statements, from different types of applications. For yet another example, users of system 100 may utilize runtime monitoring to intercept SQL statements 120 as they are submitted to database 105. Runtime monitoring may be used for different purposes including intercepting SQL statements and detecting deadlocks. In some embodiments, where DCAs 110 may be tested before they are released to customers, using runtime monitoring may assist users of system 100 to increase the accuracy of Petri net models 145 and augmented Petri net models 155, and/or, increase the permissiveness of supervisory control 165.

Still referring to the embodiment as shown in FIG. 1, SQL statements 120 and transactions 130 may be transmitted to parser 125. In some embodiments, parser 125 may parse SQL statements 120 and transactions 130 into syntax trees (not shown). In some embodiments, these syntax trees may be transmitted to modeler 140. In some embodiments, modeler 140 may generate Petri net models 145 based on these syntax trees and database schema 135. In some embodiments, Petri net models 145 may be transmitted to supervisory control modeler 150, which may in turn generate augmented Petri net models 155. It is contemplated that supervisory control modeler 150 contains appropriate algorithms for generating augmented Petri net models 155.

In some embodiments, augmented Petri net models 155 may be transmitted to supervisory control generator 160, which may in turn generate supervisory control 165. In some embodiments, supervisory control 165 may be used as a program through which DCAs 110 transmit transactions 130 to database 105. It is contemplated that supervisory control 165 may be incorporated as a component in DBMSes. In some embodiments, supervisory control 165 may predict a deadlock, and serialize conflicting transactions in order to facilitate the removal of the deadlock predicted. In some embodiments, supervisory control 165 may predict a deadlock and identify one or more transactions 130 that may potentially cause the deadlock. Users of system 100 may revise, modify and/or remove one or more transactions 130, one or more SQL statements 120, and/or source code of one or more DCAs to remove the potential deadlock. In some embodiments, users of system 100 may revise a combination thereof, such as revising one or more transactions 130 and one or more SQL statements 120, or revising one or more transactions 130, one or more SQL statements 120, and source code of one or more DCAs, etc. In some embodiments, database 105 may be updated to include any revised, modified transactions 130, SQL statements 120, or source code of DCAs. It is contemplated that supervisory control generator 160 may generated a plurality of supervisory controls. It is also contemplated that different supervisory controls may be generated for handling deadlocks caused by different DCAs.

Table 1 below provides an example of database deadlock.

TABLE 1

Exemplary Database Deadlock

| No. | Transaction $T_1$ | Transaction $T_2$ |
|---|---|---|
| 1 | UPDATE authors SET citations = 100 WHERE paperid = 1 | |
| 2 | | UPDATE titles SET copyright = 1 WHERE titleid = 2 |
| 3 | SELECT title, doi FROM titles WHERE titleid = 2 | |
| 4 | | SELECT authorname FROM authors WHERE paperid = 1 |

As shown in Table 1, two DCAs execute transactions $T_1$ and $T_2$ independently. When the first DCA executes the statement UPDATE that is shown in Row 1 under transaction $T_1$, the database locks rows in the table authors that contain values of the attribute paperid equal to 1. Next, the second DCA executes the statement UPDATE that is shown in Row 2; the database locks rows in the table titles that contain values of the attribute titleid equal to 2. When the statement SELECT is executed as part of the transaction $T_1$ as shown in Row 3, the database attempts to obtain a read lock on the rows of the table titles, which is exclusively locked by the transaction $T_2$ of the second DCA. Since these locks are not compatible in major databases (such as a SQL server), $T_1$ is put on hold. Finally, the statement SELECT is executed as part of the transaction $T_2$ as shown in Row 4, the database attempts to obtain a read lock on the rows of the table authors, which are exclusively locked by the transaction $T_1$ of the first DCA. At this point, both $T_1$ and $T_2$ are put on hold resulting in a database deadlock.

Figure 2:
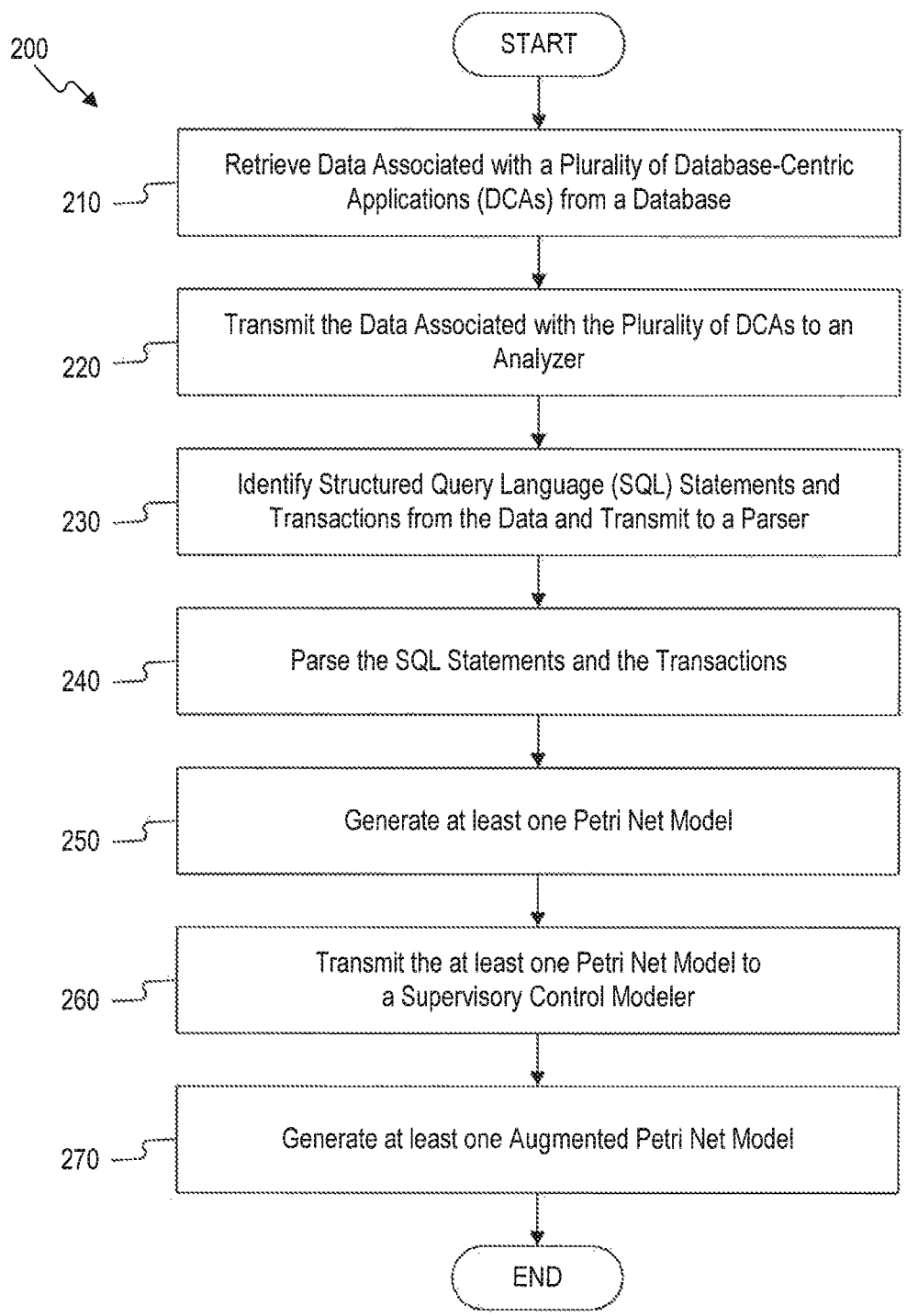
FIG. 2 illustrates an exemplary process for handling database deadlocks induced by database-centric applications.

FIG. 2 illustrates an exemplary process 200 of handling database deadlocks induced by database-centric applications. For example, exemplary process 200 may be employed in handling the database deadlock of transactions $T_1$ and $T_2$ of Table 1. In the embodiment as shown, at stage 210, data, including SQL statements 120 and transactions 130, associated with at least one DCA 110 are retrieved from database 105. To retrieve SQL statements 120 and transactions 130, execution profiles of DCAs may be captured and analyzed together with their source code. In some embodiments, at stage 220, the data associated with DCAs 100 may be transmitted to analyzer 115. In some embodiments, analyzer 115 may consist of multiple analyzing components. For example, analyzer 115 may consist of DCA static and dynamic analyzers. At stage 230, analyzer 115 may identify SQL statements 120 and transactions 130 from among the data associated with DCAs 110 retrieved from database 105, and transmit SQL statements 120 and transactions 130 to parser 125, for example.

In some embodiments, at stage 240, parser 125 may parse SQL statements 120 and transactions 130 into syntax trees (not shown) and transmit the syntax trees to modeler 140. At stage 250, modeler 140 may generate Petri net models 145 based on the syntax trees and database schema 135, for example.

Figure 3:
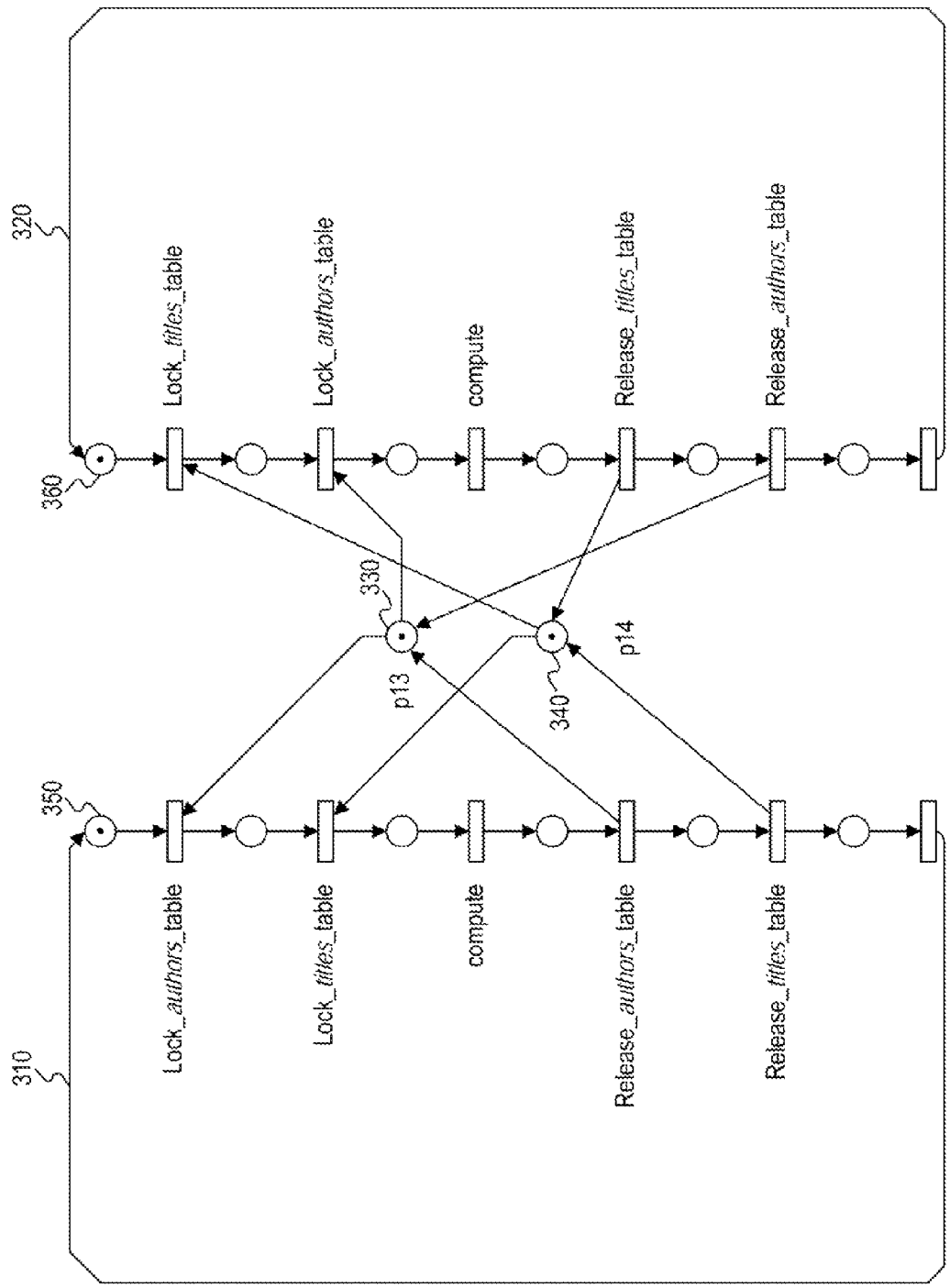
FIG. 3 illustrates an exemplary Petri net model of two exemplary transactions that cause deadlock.

FIG. 3 illustrates an exemplary Petri net model of transactions $T_1$ and $T_2$ in Table 1. It is contemplated that Petri net models 145 used in system 100 may be similar to the exemplary Petri net model. In some embodiments, transactions $T_1$ and $T_2$ may be executed concurrently. In some embodiments, transactions $T_1$ and $T_2$ may originate from different asynchronous processes contain in a given DCA. In other embodiments, transactions $T_1$ and $T_2$ may originate from different DCAs. In yet other embodiments, each transaction $T_1$ and $T_2$ may consist of a set of operations requesting mutually exclusive database resources, such as read-locks or write-locks on database tables or table rows. One of skill in the art will appreciate that the flow of operations within each transaction follows the traditional control structures of programming languages including, for example, sequential execution, conditional choice, and/or iteration.

In the embodiment as shown, the Petri net model includes places $(p_1$-$p_s)$ represented by circles and transitions represented by rectangles. In this embodiment, section 310 includes places and transitions relating to transaction $T_1$ and section 320 includes places and transitions relating to transaction $T_2$. In addition, in this embodiment, places $p_{13}$ and $p_{14}$ (330, 340) model the locks tables titles and authors. Places $p_1$ and $p_2$ (350, 360) may capture the initial state of transactions $T_1$ and $T_2$, for example. In this embodiment, deadlock occurs when transaction $T_1$ locks the table authors and transaction $T_2$ locks the table titles.

Figure 4:
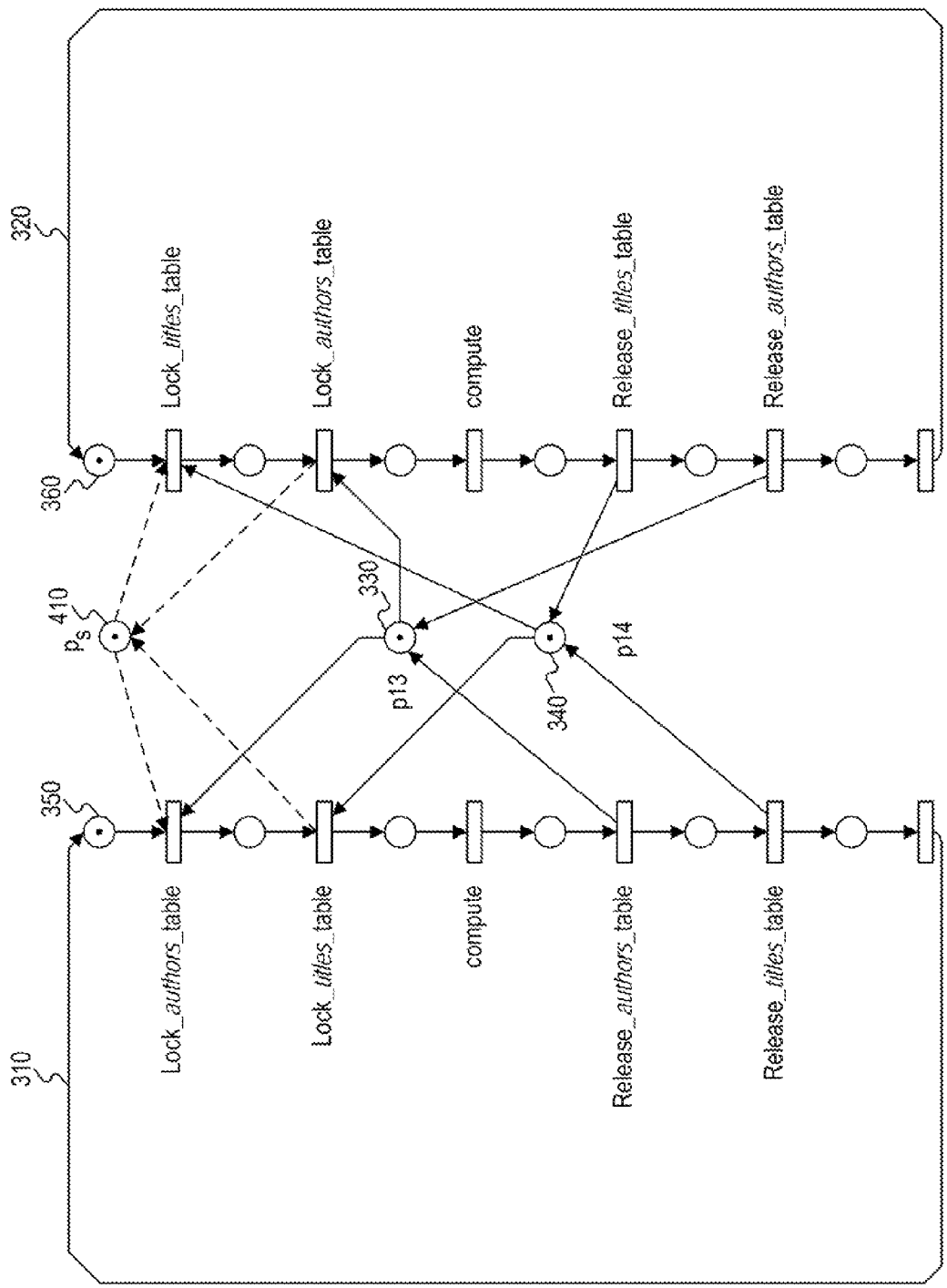
FIG. 4 illustrates an exemplary augmented Petri net model of two exemplary transactions that cause deadlock.

FIG. 4 illustrates an exemplary augmented Petri net model of transactions $T_1$ and $T_2$ in Table 1. It is contemplated that augmented Petri net models 155 used in system 100 may be similar to the exemplary augmented Petri net model. In some embodiments, place $p_s$ (410) shown in FIG. 4 in dashed circle represent a supervisory control 165 that may assist in prevention of the potential deadlock between transactions $T_1$ and $T_2$.

Referring again to the embodiment shown in FIG. 2, at stage 260, Petri net models 145 may be transmitted to supervisory control modeler 150. At stage 270, supervisory control modeler 150 may help to generate augmented Petri net models 155, for example. In some embodiments, augmented Petri net models may be transmitted to supervisory generator 160. In some embodiments, supervisory control generator 160 may process augmented Petri net models 155 and generate supervisory control 165, for example. In some embodiments, supervisory control 165 may be used as a program through which one or more DCAs 110 transmit transactions 130 to database 105. It is contemplated that supervisory control 165 may be incorporated as a component in DBMSes. In some embodiments, supervisory control 165 may predict a deadlock, and serialize conflicting transactions in order to facilitate the removal of the deadlock predicted. For example, supervisory control 165 generated by supervisory control generator 160 may be used to predict and/or resolve any deadlocks that may occur between transactions 130 of DCAs 110.

Figure 5:
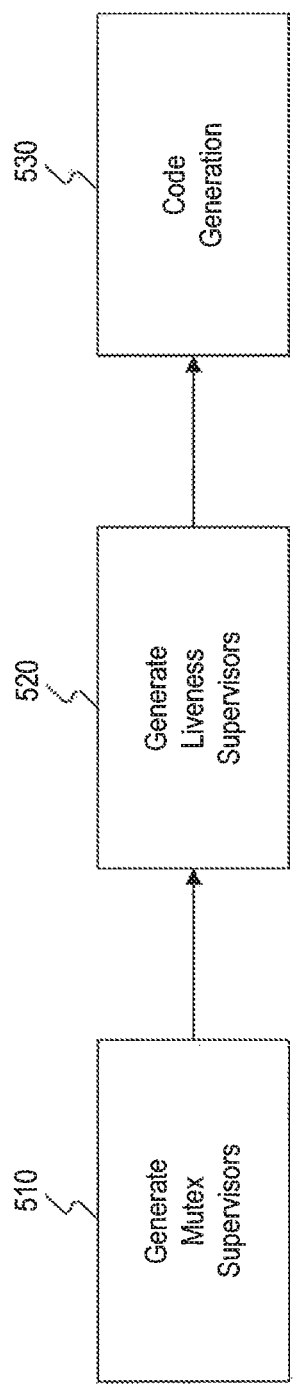
FIG. 5 illustrates an exemplary process of generating supervisor control that may be used with embodiments of the present invention.

FIG. 5 illustrates an exemplary process 500 of generating supervisory control. Exemplary process 500 also illustrates a subsequent code generation phase. In the embodiment shown in FIG. 5, supervisory control 165 is generated in three stages. In stage 510, users of system 100 may utilize existing algorithms for generating supervisors that enforce user-defined mutual exclusion properties of Petri net models. In some embodiments, the user-defined mutual exclusion properties may include definitions of which transitions may be mutually exclusive, i.e., which transitions may not be executed at the same time because they access the same shared resources. In other embodiments, the user-defined mutual exclusion properties may include rules specifying an order of execution of certain transitions. The supervisors may be in the form of augmented Petri net models in which the stated mutual exclusion properties are respected. The supervisors may be maximally permissive, such that behaviors complying with the mutual exclusion properties in the original model are still allowed in the generated model. In other words, the supervisors may help to ensure that the generated model does not violate the mutual exclusion properties in the original model. However, the generated model consisting of the original model and supervisory control 165 may contain deadlocks even though the original model was deadlock-free. For example, the original model may only include Rows 1 and 2 of transactions $T_1$ and $T_2$ (referring to Table 1), and the generated model may include Rows 3 and 4. In this example, Rows 3 and 4 may be included to address deadlocks that occur between other transactions such as $T_3$ and $T_4$ (not shown). However, Rows 3 and 4 may nevertheless result in deadlock between transactions $T_1$ and $T_2$.

In the embodiments as shown, at stage 520, supervisory controllers may be generated for enforcing the liveness of the system model. An exemplary method for generating supervisory controllers that enforce user-defined mutual exclusion constrains may be the method taught by Katerina Yamalidou, John Moody, Michael Lemmon, and Panos Antsaklis. "Feedback Control of Petri Nets Based on Place Invariants." *Automatica*, 32(1):15-28, 1996. The resulting augmented Petri net models may be free of deadlock and compliant with the specified mutual exclusion properties. At stage 530, the generated supervisors may be translated into executable code. In some embodiments, the executable code may be inserted into a database management system.

Figure 6:
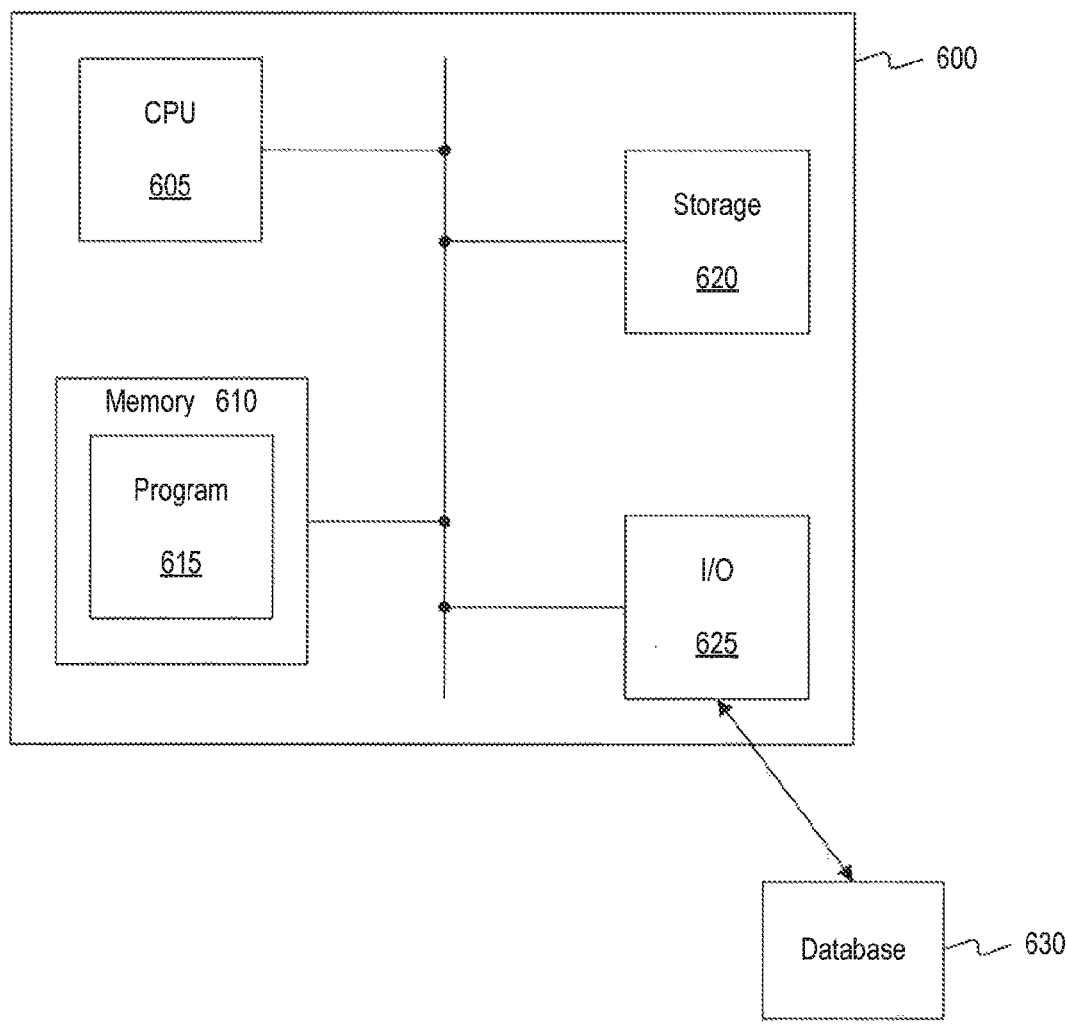
FIG. 6 illustrates an exemplary computing system that may be used with embodiments of the present invention.

FIG. 6 illustrates an exemplary computing system 600 that may be used to implement embodiments of the invention. The components and arrangement, however, may be varied within principles of the present application.

Data processing or computing system 600 includes a number of components, such as a central processing unit (CPU) 605, a memory 610, an input/output (I/O) device(s) 625, a nonvolatile storage device 620, and a database 630. System 600 can be implemented in various ways. For example, an integrated platform (such as a workstation, personal computer, laptop, etc.) may comprise CPU 605, memory 610, nonvolatile storage 620, and I/O devices 625. In such a configuration, components 605, 610, 620, and 625 may connect through a local bus interface and access database 630 (shown implemented as a separate database system) via an external connection. This connection may be implemented through a direct communication link, a local area network (LAN), a wide area network (WAN) and/or other suitable connections. In some embodiments, database 630 may be an embedded database, such that components 605, 610, 620, and 625 may access database 630 through a retrieval library (not shown).

CPU 605 may be one or more known processing devices (processor), such as, for example, a microprocessor from the Pentium™ family manufactured by Intel™ or the Turion™ family manufactured by AMD™. Memory 610 may be one or more storage devices configured to store information used by CPU 605 to perform certain functions related to embodiments of the present application. Storage 620 may be a volatile or non-volatile, magnetic, semiconductor, tape, optical, removable, non-removable, or other type of storage device or computer-readable medium. In one embodiment consistent with the disclosure, memory 610 includes one or more programs or subprograms 615 loaded from storage 620 or elsewhere that, when executed by CPU 605, performs various procedures, operations, or processes consistent with the present disclosure. For example, memory 610 may include various exemplary components included in system 100, such as, for example, database-centric applications (DCAs) 110, analyzer 115, SQL statements 120, parser 125, transactions 130, database schema 135, modeler 140, Petri net models 145, supervisory control modeler 150, augmented Petri net models 155, supervisory control generator 160, and supervisory control 165 for performing their respective functions as described above.

Methods, systems, and articles of manufacture consistent with the present disclosure are not limited to separate programs or computers configured to perform dedicated tasks. For example, memory 610 may be configured with a program 615 that performs several functions when executed by CPU 605. For example, memory 610 may include a single program 615 that performs the functions of parser 125, modeler 140, supervisory control modeler 150, and supervisory control generator. Moreover, CPU 605 may execute one or more programs located remotely from system 600. For example, system 600 may access one or more remote programs that, when executed, perform functions related to embodiments of the present disclosure.

Memory 610 may be also be configured with an operating system (not shown) that performs several functions well known in the art when executed by CPU 605. By way of example, the operating system may be Microsoft Windows™ Unix™, Linux™, an Apple Computers operating system, Personal Digital Assistant operating system such as Microsoft CE™, or other operating system. The choice of operating system, and even to the use of an operating system, is not critical to the invention.

I/O device(s) 625 may comprise one or more input/output devices that allow data to be received and/or transmitted by system 600. For example, I/O device 625 may include one or more input devices, such as a keyboard, touch screen, mouse, and the like, that enable data to be input from a user, such as concept information, status labels, database identifiers, etc. Further, I/O device 625 may include one or more output devices, such as a display screen, CRT monitor, LCD monitor, plasma display, printer, speaker devices, and the like, that enable data to be output or presented to a user. I/O device 625 may also include one or more digital and/or analog communication input/output devices that allow computing system 600 to communicate with other machines and devices. System 600 may input data from external machines and devices and output data to external machines and devices via I/O device 625. The configuration and number of input and/or output devices incorporated in I/O device 625 are not critical to the invention.

System 600 may also be communicatively connected to a database 630. Database 630 may comprise one or more databases that store information and are accessed and/or managed through system 600. In some embodiments, database 630 may be database 105. By way of example, database 630 may be an Oracle™ database, a Sybase™ database, a DB2 database, or other relational database. Systems and methods of the present disclosure, however, are not limited to separate databases or even to the use of a database.

Other embodiments of the disclosure will be apparent to those skilled in the art from consideration of the specification and practice of the disclosure provided herein. It is intended that the specification and examples be considered as exemplary only, with a true scope and spirit of the invention being indicated by the following claims.

What is claimed is:

1. A computer-implemented method for generating a program for accessing a database, the method comprising:
retrieving one or more structure query language (SQL) statements associated with one or more database-centric applications for accessing the database;
generating a syntax tree based on the one or more SQL statements,
the syntax tree identifying a data structure of an SQL statement of the one or more SQL statements;
generating a petri net model based on the syntax tree and a schema for the database;
generating an augmented petri net model, based on the petri net model, that enforces mutual exclusion properties of the petri net model for identifying a deadlock caused by the one or more database-centric applications for accessing the database; and
generating the program based on the augmented petri net model,
the program being configured to receive first transactions from the one or more database-centric applications, predict a deadlock, and provide second transactions to the database based on predicting the deadlock.

2. The computer-implemented method of claim 1, wherein generating the augmented petri net model comprises:
augmenting the petri net model by generating mutual exclusion supervisors to enforce the mutual exclusion properties of the petri net model, and
wherein generating the program comprises:
generating a supervisory control to enforce liveness of the augmented petri net model; and
generating the program by translating the supervisory control into executable code.

3. The computer-implemented method of claim 1, further comprising inserting the program into a database management system.

4. The computer-implemented method of claim 1, wherein the program prevents the predicted deadlock by serializing the first transactions to create the second transactions.

5. The computer-implemented method of claim 1, wherein capturing the one or more SQL statements are created during development of a database-centric application of the one or more database-centric applications.

6. The computer-implemented method of claim 1, wherein capturing the one or more SQL statements are recovered from source code of a database-centric application, of the one or more database-centric applications, using static analysis.

7. The computer-implemented method of claim 1, wherein one or more SQL statements are intercepted during runtime monitoring of a database-centric application of the one or more database-centric applications.

8. The computer-implemented method of claim 1, wherein the one or more SQL statements are captured before a database-centric application, of the one or more database-centric applications, is released to customers.

9. A non-transitory computer-readable storage medium storing instructions, the instructions comprising:
  one or more instructions that, when executed by at least one processor, cause the at least one processor to:
  retrieve one or more structure query language (SQL) statements associated with one or more database-centric applications for accessing a database;
  generate a syntax tree based on the execution profile one or more SQL statements,
  the syntax tree identifying a data structure of an SQL statement of the one or more SQL statements;
  generate a petri net model based on the syntax tree and a schema for a database;
  generate an augmented petri net model, based on the petri net model, that enforces mutual exclusion properties of the petri net model for identifying a deadlock caused by the one or more database-centric applications for accessing the database; and
  generate a program based on the augmented petri net model,
  the program being configured to receive first transactions from the one or more database-centric applications, predict a deadlock, and provide second transactions to the database based on predicting the deadlock.

10. The non-transitory computer-readable storage medium of claim 9,
  wherein the one or more instructions to generate the augmented petri net model comprise:
  one or more instructions that, when executed by the at least one processor, cause the at least one processor to:
  augment the petri net model by generating mutual exclusion supervisors to enforce the mutual exclusion properties of the petri net model, and
  wherein the one or more instructions to generate the program comprise:
  one or more instructions that, when executed by the at least one processor, cause the at least one processor to:
  generate a supervisory control to enforce liveness of the augmented petri net model; and
  generate the program by translating the generated supervisory control into executable code.

11. The non-transitory computer-readable storage medium of claim 9, where the instructions further comprise:
  one or more instructions that, when executed by the at least one processor, cause the at least one processor to:
  insert the program into a database management system.

12. The non-transitory computer-readable storage medium of claim 9, wherein the program prevents the predicted deadlock by serializing the first transactions to create the second transactions.

13. The non-transitory computer-readable storage medium of claim 9, wherein the one or more SQL statements are created during development of a database-centric application of the one or more database-centric applications.

14. The non-transitory computer-readable storage medium of claim 9, wherein the one or more SQL statements are recovered from source code of a database-centric application, of the one or more database-centric applications, using static analysis.

15. The non-transitory computer-readable storage medium of claim 9, wherein the one or more SQL statements are intercepted during runtime monitoring of a database-centric application of the one or more database-centric applications.

16. A system comprising:
  a memory to store a database; and
  a processor to:
  retrieve one or more structure query language (SQL) statements associated with one or more database-centric applications for accessing the database;
  generate a syntax tree based on the execution profile one or more SQL statements,
  the syntax tree identifying a data structure of an SQL statement of the one or more SQL statements;
  identify a schema for the database;
  generate a petri net model based on the syntax tree and the schema for the database;
  generate an augmented petri net model, based on the petri net model, that enforces mutual exclusion properties of the petri net model for identifying a deadlock caused by the one or more database-centric applications for accessing the database; and
  generate a program based on the augmented petri net model,
  the program being configured to receive first transactions from the one or more database-centric applications, predict a deadlock, and provide second transactions to the database based on predicting the deadlock.

17. The system of claim 16, wherein, when generating the augmented petri net model, the processor is to:
  generate the augmented petri net model by augmenting the petri net model to enforce the mutual exclusion properties of the petri net model.

18. The system of claim 16, wherein the program prevents the predicted deadlock by serializing the first transactions to create the second transactions.

19. The system of claim 16, wherein one or more SQL statements are recovered from source code of a database-centric application, of the one or more database-centric applications, using static analysis.

20. The system of claim 16, one or more SQL statements are intercepted during runtime monitoring of the database-centric application.

* * * * *